United States Patent
Hilgert et al.

(10) Patent No.: US 6,244,299 B1
(45) Date of Patent: *Jun. 12, 2001

(54) DAMPING ELEMENT

(75) Inventors: Andreas Hilgert, Sinzheim; Michael Seidel-Peschmann, Baden-Baden, both of (DE)

(73) Assignee: Aeroquip Corporation, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/382,055

(22) Filed: Aug. 24, 1999

(30) Foreign Application Priority Data

Nov. 13, 1998 (DE) .............................. 198 52 278

(51) Int. Cl.$^7$ ...................................... F16L 55/04
(52) U.S. Cl. ............................................... 138/26
(58) Field of Search ............................. 138/109, 120, 138/26, 142, 147, 148, 149; 285/238, 340

(56) References Cited

U.S. PATENT DOCUMENTS

| | | | |
|---|---|---|---|
| 2,993,559 | 7/1961 | Everett | 181/53 |
| 3,985,378 | * 10/1976 | Muller | 285/49 |
| 4,059,294 | * 11/1977 | Falcone | 285/238 |
| 4,616,856 | * 10/1986 | Kowalyshen | 285/238 |
| 4,682,797 | * 7/1987 | Hildner | 285/238 |
| 4,887,630 | 12/1989 | Hill | 137/72 |
| 5,104,150 | * 4/1992 | Bard et al. | 285/238 |
| 5,253,680 | * 10/1993 | Matsumoto | 138/148 |
| 5,570,762 | 11/1996 | Jentsch et al. | 188/322.15 |
| 5,601,275 | 2/1997 | Hironaka | 251/129.15 |
| 5,634,653 | 6/1997 | Browning | 280/276 |
| 5,640,892 | 6/1997 | Kauss et al. | 91/447 |
| 5,642,628 | * 7/1997 | Whipple, III et al. | 62/186 |
| 5,704,462 | 1/1998 | Grospietsch et al. | 192/85 |
| 5,738,467 | 4/1998 | Aidlin et al. | 406/86 |
| 5,740,890 | 4/1998 | Forster | 188/322.2 |
| 5,820,227 | 10/1998 | Spero | 303/87 |

FOREIGN PATENT DOCUMENTS

| | | |
|---|---|---|
| 318869 | 6/1919 | (DE) . |
| 298151 | 10/1983 | (DE) . |
| 1170212 | 11/1956 | (FR) . |
| 1536140 | 9/1967 | (FR) . |

* cited by examiner

Primary Examiner—Lesley D. Morris
Assistant Examiner—Davis Hwu
(74) Attorney, Agent, or Firm—Emch, Schaffer, Schaub & Porcello, Co., L.P.A.

(57) ABSTRACT

A damping element is proposed for a conduit conducting a gaseous or liquid medium through which pressure pulsations are applied, which is constructed as a hollow body through which the medium can flow, and is attached to a fastening element in such a way that the damping element is pushed into an opening provided in the fastening element. The inner surface of the fastening element may be provided with elevations and/or depressions produces a connection with enhanced frictional grip between the damping element and the fastening element.

20 Claims, 3 Drawing Sheets

DAMPING ELEMENT

DISCLOSURE OF THE INVENTION

The invention relates to a damping element for a conduit conducting a gaseous or liquid working medium through which pressure pulsations are applied.

Damping elements, also called tuners, of the type addressed here are known. They serve, inter alia, in hydraulic hoses for damping pulsations. These pulsations in hydraulic or pneumatic systems arise from the fact that the working medium is conveyed by pumps or pumping systems which introduce periodically recurring pressure fluctuations into the system. Examples of such pumps or pumping systems are vane pumps or radial piston pumps, but also diaphragm pumps, such as are used in the automobile industry in steering servo systems and brake systems, and as fuel injection pumps. The pulsations of the working medium cause the conduits, mostly hoses or pipes, conveying the medium to execute vibrations which, for their part, can incite the surrounding air to execute vibrations and lead to an undesired generation of noise in the system. It is therefore necessary to develop elements which dampen the pulsations in hydraulic or pneumatic systems. These damping elements are constructed as small hollow bodies through which flow can occur, for example, as tubular elements which are arranged inside the conduit conducting the working medium. In this case, these damping elements are held with the aid of fastening elements which have fastening nipples onto which the damping elements are fitted. However, this means that the full cross-section of the damping element is not available for the working medium to flow through, and this is associated with a pressure loss in the conduit and an increase in the temperature of the working medium. Both lead to a poor energy balance of the entire system. It is therefore an object of the invention to create a damping element of the type mentioned at the beginning which eliminates the disadvantages named here.

A damping element having the features of the present invention can achieve the foregoing. It is distinguished in that it can be plugged into the fastening element which will anchor the damping element. Consequently, the full cross-sectional surface is available to be flowed through by the working medium flowing through the fastening element and through the damping element. Pressure losses and temperature increases are therefore virtually excluded.

In the simplest exemplary embodiment, the inner surface of the opening of the fastening element has no contour, so that the connection between the fastening element and damping element comes about solely from the static friction between the two. It is particularly economical to realize this variant.

In a preferred exemplary embodiment, it is provided that the inner side of the opening of the fastening element, into which the damping element is plugged, is provided with elevations and/or depressions which enhance the frictional grip between the fastening element and damping element. This ensures a very high functional reliability.

Moreover, an exemplary embodiment is preferred in which the elevations and/or depressions are arranged on the inner surface of the opening of the fastening element in an annular or spiral shape. This refinement ensures a stronger frictional grip between the fastening element and the damping element, thus enhancing the grip between the two elements.

A further exemplary embodiment of the damping element is distinguished in that the push-in contour on the inner surface of the opening of the fastening element is provided with teeth (similar to the surface of a file or rasp) by means of which the damping element is securely held.

Further, refinements are set forth in the following description.

BEST MODE OF CARRYING OUT THE INVENTION

Figure 1:
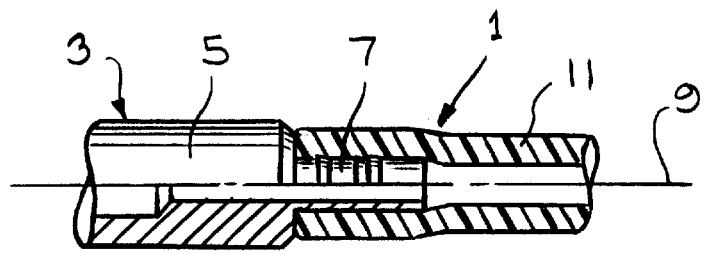
FIG. 1 shows a known damping element in partial section.

FIG. 1 shows a damping element 1 which is attached in a conventional way to a fastening element 3. For this purpose, the fastening element 3 is provided with a fastening nipple 7 which proceeds from the basic body 5 of said element fastening element 3 and onto which the damping element 1 is pushed.

In the representation in accordance with FIG. 1, the part of the fastening element 3 represented below the center line 9 and all of the damping element 1 is represented in section. It can be seen that, just like the fastening nipple 7, both the fastening element 3 and the damping element 1 are of hollow construction and can be flowed through by a gaseous or liquid medium. It is clear that the free inside diameter of the damping element 1 is greater than that of the fastening nipple 7. FIG. 1 also shows that the wall 11 of the damping element 1 is somewhat widened in the region of the fastening nipple 7.

Figure 2:
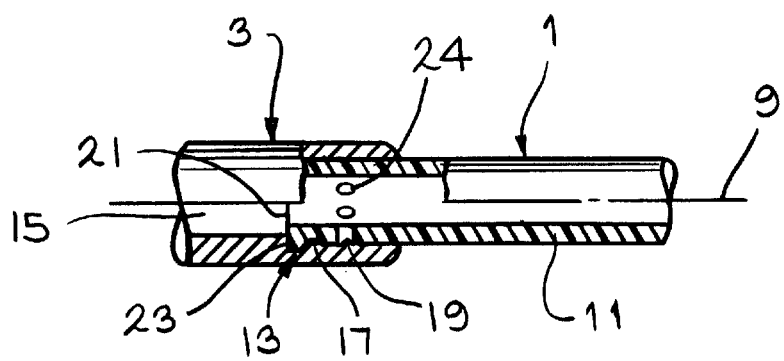
FIG. 2 shows a damping element according to the invention attached to a fastening element, in partial section.

The representation in accordance with FIG. 2 reproduces a damping element 1 and a fastening element 3. Identical parts are provided with identical reference numerals, to which extent reference is therefore made to the description based on FIG. 1.

The damping element 1 is pushed into the fastening element 3 in the refinement reproduced in FIG. 2. This becomes plain, in particular, from the sectional representation below the center line 9. The interior of the damping element 1 remains completely free. Impairment of the flow behavior of the gaseous or liquid working medium in the region of the transition from the damping element 1 to the fastening element 3 does not occur here. The above described disadvantages of pressure reduction and increase in temperature in the region of the damping element 1 as attached to the fastening element 3 are avoided here virtually completely.

The fastening element 3 reproduced in FIG. 2 is of hollow construction, for example, essentially tubular. Enlargement of the inside diameter is provided in the fastening region, thus producing an opening 13 for holding the damping element 1. Said opening 13 is distinguished by a larger inside diameter than that in the remaining region of the fastening element 3. It is realized, for example, by virtue of the fact that the fastening element 3 is bored in the holding region of the damping element 1. The widening of the diameter can also be achieved by any desired material-removing machining method, for example, by turning or the like. Finally, it is also conceivable when producing the fastening element 3 not only to provide the through channel 15, but also to produce the opening 13.

If the fastening element 3 is produced, for example, from plastic, the through channel 15 and the opening 13 can be produced using a shaping method. It is also conceivable to produce the fastening element from a sintered material and in so doing, to produce the through channel 15 and opening 13. Finally, this is also conceivable in the case of a casting operation of a fastening element 3 consisting of metal.

As shown in FIG. 2, the fastening element is provided with two elevations or annular beads 17 and 19 projecting above the inner surface of the opening 13 in the direction of the center line 9 which engage in the outer surface of the damping element 1, in the wall 11 thereof.

It is conceivable in this case that the wall 11 is pressed in by the elevations 17 and 19 because of its inherent elasticity, with the result that the damping element 1 is held securely in the fastening element 3. If the wall 11 consists of a material which does not have such an elasticity, with the result that the elevations 17 and 19 cannot press in there, it is possible to provide depressions in the other surface of the wall 11 so that the elevations 17 and 19 are securely held there and retain the damping element 1.

It is possible that the inner surface in the region of the opening 13 can also be provided with depressions into which the wall 11 of the damping element 1 projects. In this case it is conceivable to construct the wall 11 from an elastic material which is compressed in the region of the opening 13 and which expands in the region of the depressions of the inner surface of the opening 13 and is virtually interlocking there. It is possible to provide defined elevations on the outer surface of the damping element 1 at least in the plug-in region of the opening 13, which then project into depressions on the inner surface of the opening 13.

The damping element 1 is produced from a flexible material, preferably plastic, in particular polytetrafluoroethylene (PTFE). Because the damping element 1 is flexible, it can adapt to the shape to which it is constrained to adopt by the annular beads 17 and 19 of fastening element 3 to which it is attached and the hose for conducting the liquid or gaseous medium. Preferably, the wall 11 of the damping element 1 is provided with a series of apertures 24.

Figure 3:
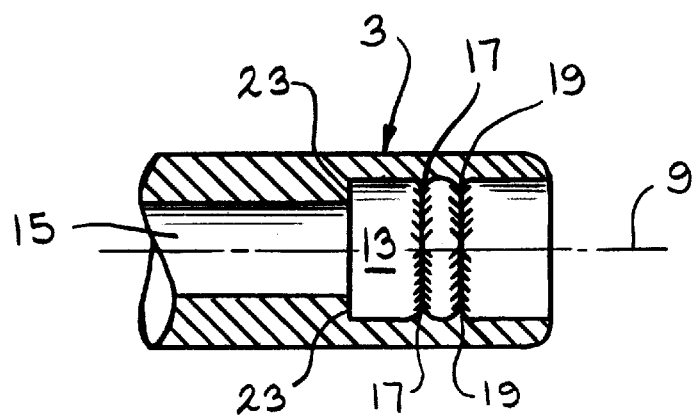
FIG. 3 shows a fastening element with elevations, formed in an annular fashion on the inner side of the opening for holding the damping element, in longitudinal section.

As indicated in FIG. 3, the elevations 17 and 19 and the depressions in the damping element 1 in which the elevations engage can form rings arranged at a spacing from one another. Seen in the circumferential direction, the elevations 17 and 19 are then constructed continuously and, as previously discussed, form depressions on the outer side in the wall 11 of the damping element 1. Instead of a plurality of parallel rings comprising elevations 17 and 19, a single elevation is also conceivable which extends around on the inner surface of the opening 13 of the fastening element 3 in the shape of a spiral.

It is also conceivable to provide in the region of the inner surface of the opening 13 a thread into which the damping element 1 is screwed until the end face 21 of the damping element 1 abuts a step 23 which is formed by virtue of the fact that the inside diameter is larger in the region of the opening 13 than in the region of the through channel 15. In the exemplary embodiment represented here, the step 23 runs essentially perpendicular to the center line 9 in order to ensure a defined stop.

Figure 4:
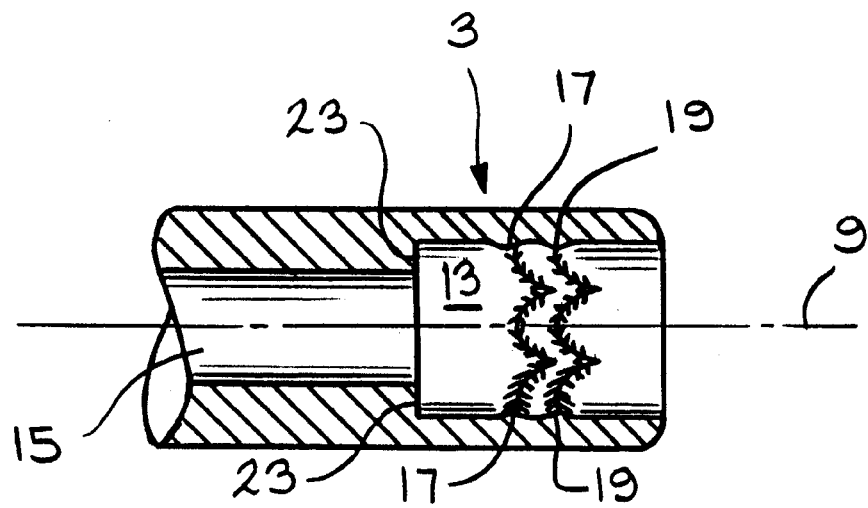
FIG. 4 shows a fastening element with a push-in contour located on the inner side of the opening and comprising teeth, in longitudinal section.

It is conceivable, furthermore, to construct the elevations 17 and 19 such that, seen in the circumferential direction, they comprise a plurality of groups of individual elevations which are arranged on an imaginary helix or on imaginary circular lines which possibly also run parallel to one another, as is also indicated in FIG. 4. The inner surface of the opening 13 then resembles the surface of a file or rasp. Such individual elevations can sink in particularly effectively into the outer surface of the damping element 1 and anchor the latter reliably on the fastening element 3.

Figure 5:
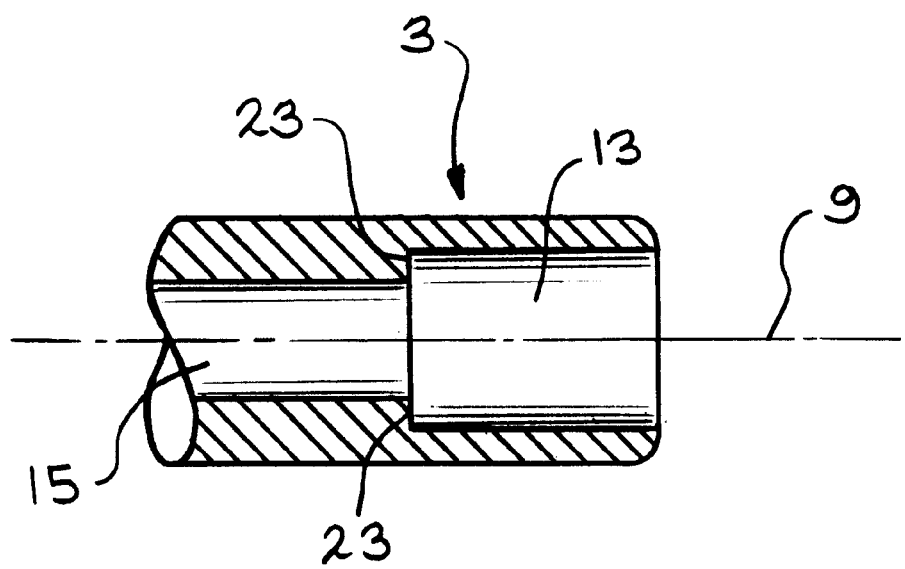
FIG. 5 shows a fastening element without a special push-in contour on the inner side of the opening, in longitudinal section.

As represented in FIG. 5, the opening 13 can be provided in the plug-in region of the damping element 1 with a smooth inner surface whose inside diameter is matched to the outside diameter of the damping element 1 such that the latter is held firmly in the opening 13 and, by virtue of static friction, cannot inadvertently slip out of the fastening element 3.

It is provided in other embodiments that the wall 11 of the damping element 1 has juxtaposed spirals which lie closely next to one another. However, it is possible for the medium flowing through the damping element 1 to emerge through the interspace between neighboring spirals in the event of pulsations by flowing through apertures 24 in the wall 11.

The pressure wave running through the hydraulic medium is damped by the damping element 1 in two different ways: in the ideal case (of interest only given constant excitation), the pressure wave propagating in the liquid or gaseous medium has a wavelength $\lambda$. If the damping element 1 has a length which corresponds precisely to a quarter of this wavelength $\lambda$, a pressure wave which runs back on the outside of the damping element 1 against the direction of flow and is reflected at the end has a phase shift of half a wavelength upon encountering the next pressure wave at the outlet end of the damping element 1. The pressure wave is thus completely damped after running through the damping element, that is to say nothing more is left of the pressure wave in this ideal case. In practice, this ideal case can be realized only given a constant pump speed. The pressure wave mostly contains various wavelengths components, for which reason only a part of the pressure wave is damped by the damping element 1. In order to achieve a more broad-band damping effect, use is made of the openings 24 introduced into the wall 11 of the damping elements 1. Specifically, if the hydraulic medium passes through these openings 24, eddies are produced which partially reflect and additionally damp the pressure wave running through the fastening element 3 and the damping element 1. In the case of the damping elements constructed as spirals, this type of damping can be realized by virtue of the fact that the medium emerges between the spirals.

Figure 6:
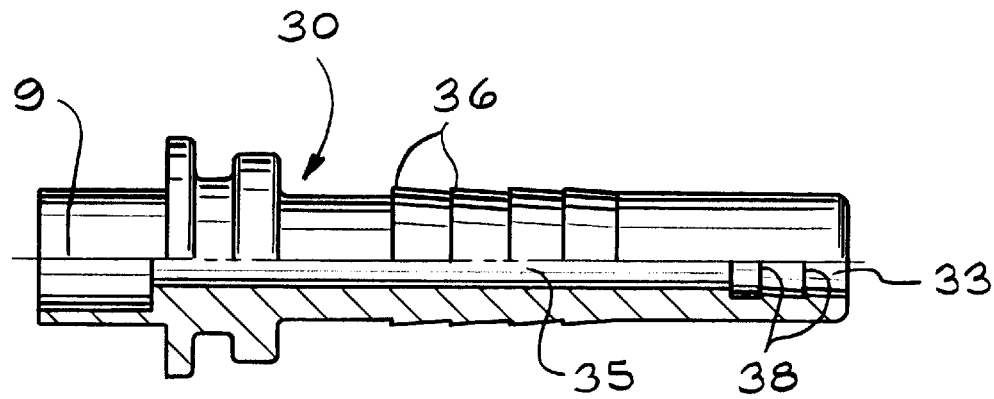
FIG. 6 is an elevational view, partly in section, of a preferred form of fastening element suitable for use with the damping element.
Figure 7:
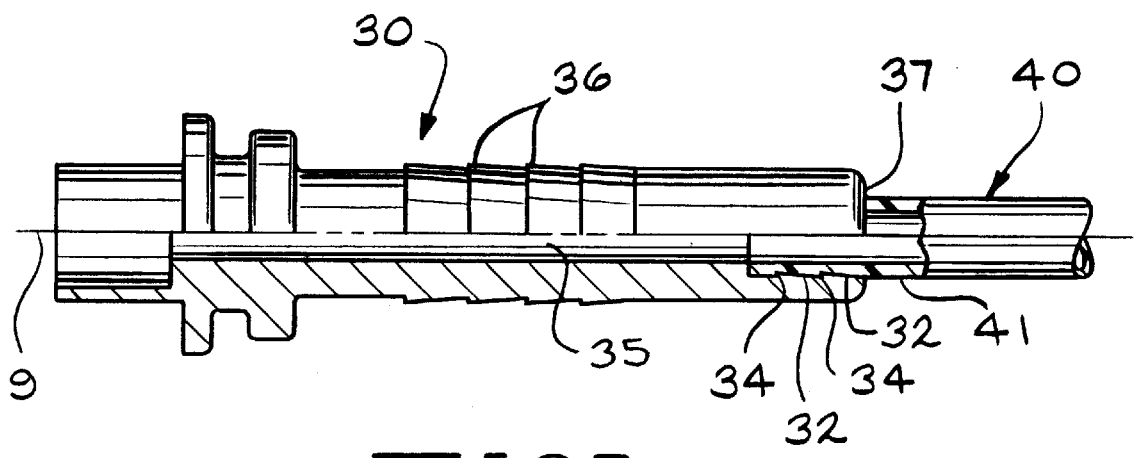
FIG. 7 is an elevational view, partly in section, showing the damping element in combination with the fastening element of FIG. 6.

Referring to FIGS. 6 and 7, there is shown an additional embodiment of the nipple and damper of the present invention. In FIG. 6, there is shown a nipple or fastening element 30 having an opening 33 and a through channel 35. Externally, the nipple or fastening element 30 is provided with a plurality of circumferentially extending teeth 36 for engaging and retaining the internal surface of a hose connected thereto.

Internally, the interior surface defining the opening 33 is provided with circumferentially extending teeth 38 for engaging the outer wall 41 of the damping element 40. The teeth 38 are defined by wall sections 32 which taper inwardly toward the center line 9 at an angle of approximately 5° relative to the center line 9 in a direction extending away from the receiving end 37 of the nipple or fastening element 30. Each tapering wall segment 32 terminates in a shoulder 34 having a sharp edge which deforms the outer wall 41 of the damping element 40 thereby retaining the damping element 40 on the nipple or fastening element 33.

If desired, the damping element 40 could also be provided with apertures extending outwardly therethrough to the outer wall 41 similar to the apertures 24 of the embodiment of FIG. 2.

The description of the present invention has shown that it is possible to provide on the fastening element and on the damping element means such as elevations and/or depressions which enhance the frictional grip and/or self-closure between the fastening element and damping element. The advantage described results in both cases, specifically reliable holding between the fastening element and damping element.

Other modifications will become readily apparent to those skilled in the art. Accordingly, the scope of the present invention should be limited only by the scope of the claims.

We claim:

1. In combination, a damping element for a conduit conducting a gaseous or liquid medium through which pressure pulsations are applied, said damping element constructed as a hollow body having an annular wall through which the medium can flow, and a fastening element engaged thereto, said fastening element having an opening into which said damping element can be plugged, said damping element annular wall having one or more apertures extending therethrough in an area permitting said apertures to reach said fastening element.

2. In combination a damping element for a conduit conducting a gaseous or liquid medium through which pressure pulsations are applied, said damping element constructed as a hollow body having an annular wall through which the medium can flow, and a fastening element engaged thereto, said fastening element having an opening into which said damping element can be plugged and an inner surface having elevations or depressions which serve to enhance the frictional grip and cooperate with the outer surface of said damping element, said damping element annular wall having one or more apertures extending therethrough in an area permitting medium flowing through said apertures to reach said elevations or depressions.

3. The combination according to claim 2, characterized in that said elevations or depressions are arranged on the inner surface of the opening of the fastening element in an annular or spiral shape.

4. The combination according to claim 2, characterized in that the inner surface of the opening of said fastening element has a plurality of groups of individual elevations or depressions running parallel to one another.

5. The combination according to claim 2, characterized in that groups of said elevations or depressions are angularly offset relative to one another.

6. The combination according to claim 2, characterized in that the fastening element is flexible.

7. In combination, a damping element for a conduit conducting a gaseous or liquid medium through which pressure pulsations are applied, said damping element constructed as a hollow body having an annular wall of substantially uniform inside diameter through which the medium can flow, and a fastening element engaged thereto, said fastening element having a through channel for receiving said medium, said fastening element including an enlarged opening and a step between said channel and said enlarged opening, said damping element being frictionally received in said enlarged opening in abutting relationship with said step.

8. A damping element according to claim 7, wherein said step is substantially perpendicular to the axis of said annular wall and said damping element abuts said step.

9. The combination according to claim 7, characterized in that the inner surface of said fastening element has elevations or depressions which serve to enhance the frictional grip and cooperate with the outer surface of said damping element.

10. The combination according to claim 9, characterized in that said elevations or depressions are arranged on the inner surface of the opening of the fastening element in an annular or spiral shape.

11. The combination according to claim 9, characterized in that the inner surface of the opening of said fastening element has a plurality of groups of individual elevations or depressions running parallel to one another.

12. The combination according to claim 9, characterized in that groups of said elevations or depressions are angularly offset relative to one another.

13. In combination, a damping element for a conduit conducting a gaseous or liquid medium through which pressure pulsations are applied, said damping element constructed as a hollow body having an annular wall of substantially uniform inside diameter through which the medium can flow, and a fastening element engaged thereto, said fastening element having a through channel for receiving said medium, said fastening element including an enlarged opening and a step between said channel and said enlarged opening, said damping element being received in said enlarged opening, characterized in that said damping element hollow body has a wall and said wall has one or more apertures extending therethrough in an area permitting said apertures to reach said fastening element.

14. In combination,
 (a) a damping element for a conduit conducting a gaseous or liquid medium through which pressure pulsations are applied, said damping element constructed as a hollow body having
  (i) an annular inner wall surface of substantially uniform inside diameter through which the medium can flow, and
  (ii) an outer wall surface, and
 (b) a fastening element engaged thereto, said fastening element having
  (i) a through channel for receiving said medium, and
  (ii) an inner surface having elevations or depressions engageable with said outer wall surface which serve to enhance frictional gripping and cooperate with said outer wall surface of said damping element.

15. The combination according to claim 14, characterized in that said elevations or depressions are arranged on the inner surface of said fastening element in an annular or spiral shape.

16. The combination according to claim 14, characterized in that the inner surface of said fastening element has a plurality of groups of individual elevations or depressions running parallel to one another.

17. The combination according to claim 14, characterized in that groups of said elevations or depressions are angularly offset relative to one another.

18. A damping element according to claim 14, wherein said fastening element includes an enlarged opening and a step between said channel and said enlarged opening, said damping element being received in said enlarged opening.

19. A damping element according to claim 18, wherein said step is substantially perpendicular to the axis of said annular wall and said damping element abuts said step.

20. In combination,
   (a) a damping element for a conduit conducting a gaseous or liquid medium through which pressure pulsations are applied, said damping element constructed as a hollow body having
      (i) an annular inner wall surface of substantially uniform inside diameter through which the medium can flow, and
      (ii) an outer wall surface, and
   (b) a fastening element engaged thereto, said fastening element having
      (i) a through channel for receiving said medium, and
      (ii) an inner surface having elevations or depressions engageable with said outer wall surface which serve to enhance frictional gripping and cooperate with said outer wall surface of said damping element characterized in that said damping element hollow body has one or more apertures extending from said inner wall surface to said outer wall surface in an area permitting said apertures to reach said fastening element.

* * * * *

UNITED STATES PATENT AND TRADEMARK OFFICE
CERTIFICATE OF CORRECTION

PATENT NO. : 6,244,299 B1
DATED : June 12, 2001
INVENTOR(S) : Andreas Hilgert & Michael Seidel-Peschmann It is certified that error appears in the above-identified patent and that said Letters Patent is hereby corrected as shown below:

<u>Title page,</u>
At the (*) Notice section, please delete -- This patent is subject to a terminal disclaimer. --

Signed and Sealed this

Twenty-ninth Day of January, 2002

*Attest:*

JAMES E. ROGAN
*Attesting Officer*     *Director of the United States Patent and Trademark Office*